Patented Jan. 10, 1928.

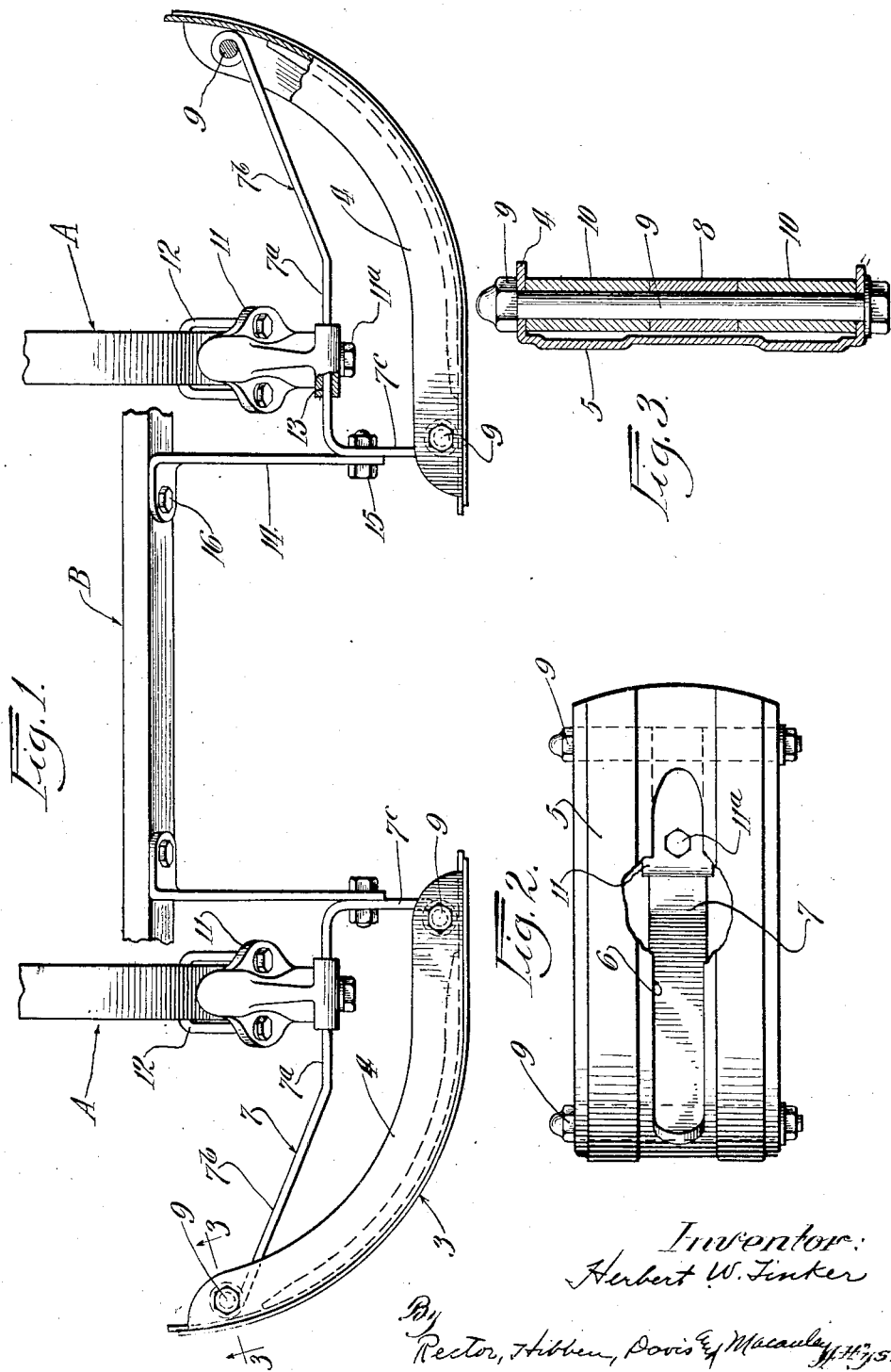

1,655,802

UNITED STATES PATENT OFFICE.

HERBERT W. TINKER, OF MILWAUKEE, WISCONSIN, ASSIGNOR TO FEDERAL PRESSED STEEL COMPANY, OF MILWAUKEE, WISCONSIN, A CORPORATION OF WISCONSIN.

BUMPER DEVICE FOR VEHICLES.

Original application filed April 17, 1926, Serial No. 102,805. Divided and this application filed April 22, 1927. Serial No. 185,743.

My invention relates to bumper devices for vehicles, and more particularly to that class generally known as fender guards in which the impact members at the rear of the vehicle are spaced apart to accommodate a spare tire therebetween.

This application is a division of my application Serial No. 102,805, filed April 17, 1926, for bumper devices for vehicles.

The principal object of my invention is to provide improved means for supporting the impact member of each fender guard and also improved means for mounting the fender guards on the vehicle.

The above and further objects and advantages of my improved fender guard structure will become apparent from the following description, taken in conjunction with the accompanying drawings wherein,—

Figure 1 is a top plan view showing fender guards mounted on the rear end of the chassis frame in accordance with my invention, the representation of the chassis frame and associate parts being diagrammatic.

Figure 2 is a rear elevation of the left-hand fender guard shown in Fig. 1.

Figure 3 is a cross-sectional view taken through one end of one of the fender guards as on line 3—3 of Fig. 1.

Referring to the drawings, the impact bars or members shown in the various views are alike and of arcuate form and each preferably consists of a sheet metal bar 3, pressed in a die to form forwardly extending flanges 4 at the upper and lower edges of its web or face 5 which is provided with an elongated opening 6 (Fig. 2).

As shown in Fig. 1, the impact bar 3 is supported by a one-piece spring-supporting bar or strap 7, having eyes 8 integrally formed at its ends for the reception of bolts 9 which project through holes in the flanges 4 and through the integral eyes 8 and suitable spacing collars 10 which are positioned between the eyes 8 and flanges 4. It will be noted that the spring-supporting bar 7 is bent to provide a laterally extending portion 7$^a$ and a forwardly inclined portion 7$^b$ and a rearwardly extending arm 7$^c$. The portion 7$^a$ of each of the supporting bars or straps 7 is connected to a securing bracket 11 which is, preferably, of a rigid type and adapted to be connected to the end of the side sill of the chassis, illustrated at A, by means of a U-bolt 12 or by any other desired means. This bracket 11 is provided with a slot 13 through which the spring-supporting bar 7 passes and in which the bar is fastened by a screw 11$^a$.

An additional arm or bracket 14 is provided for securing the spring-supporting bar 7 to the chassis frame or to a tire carrier as illustrated at B in Fig. 1. It is to be understood that the chassis representation shown in Fig. 1 is more or less diagrammatic and is for the purpose of illustration and may be varied in form. This supporting arm 14 is preferably formed by a strap of spring metal and is L-shaped. It is connected by any desired means, such as the bolt 15, at one end to the rearwardly extending arm 7$^c$ of the supporting strap 7, and, as shown in Fig. 1, a bolt 16, which may be a U-bolt or a hook-bolt, is adapted to secure its other or forward end to the chassis frame or tire carrier.

While I have shown and described my invention as employed in connection with the rigid channel-shaped impact bars 3, yet it will be understood that two parallel, vertically spaced and arcuate-shaped spring bars may be employed instead of such bars.

I claim:

1. An impact structure comprising an impact bar, supporting means therefor comprising a spring arm projecting outwardly and pivoted to one end of said impact bar and a spring arm extending rearwardly and connected at its end to the other end of said impact bar, a bracket connected to one of said spring arms and a bracket connected to the other of said spring arms.

2. An impact structure comprising an impact bar, supporting means therefor comprising a spring arm projecting outwardly and pivoted to one end of said impact bar and a spring arm extending rearwardly and connected at its end to the other end of said impact bar, a rigid bracket connected to said first mentioned spring arm and a spring bracket connected to said other spring arm.

HERBERT W. TINKER.